Aug. 25, 1953
H. W. WYLIE
2,649,812
CONVEYER CHAIN
Filed April 2, 1951
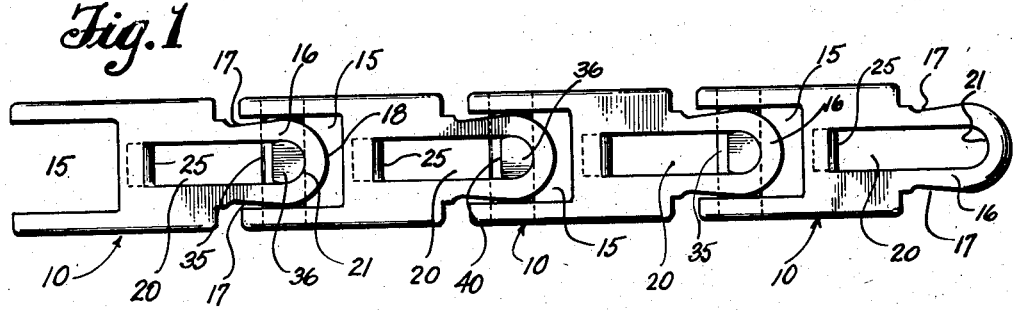
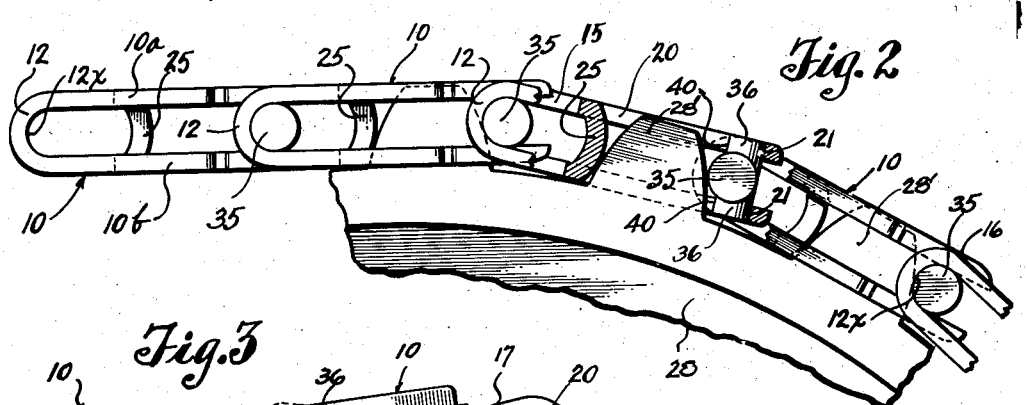
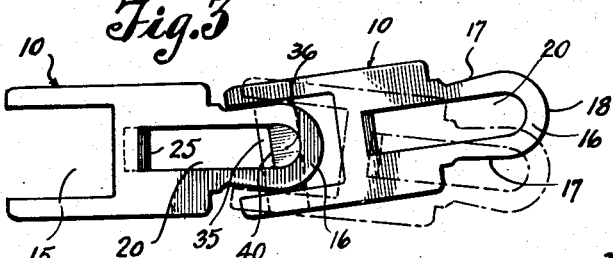
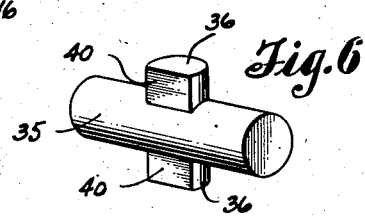
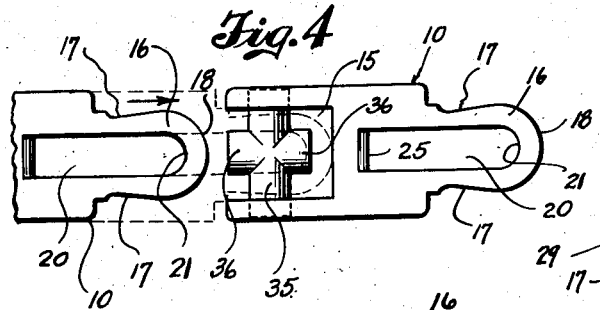
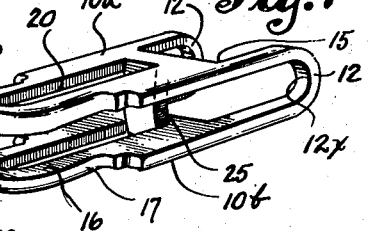
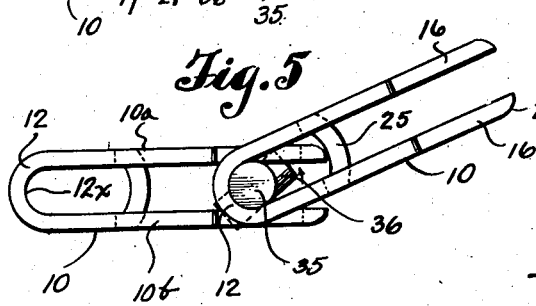
INVENTOR.
HOWARD W. WYLIE
BY
Cook + Robinson
ATTORNEYS Patented Aug. 25, 1953

2,649,812

UNITED STATES PATENT OFFICE 2,649,812

CONVEYER CHAIN

Howard W. Wylie, Seattle, Wash.

Application April 2, 1951, Serial No. 218,869

5 Claims. (Cl. 74—246)

This invention relates to conveyor chain, and it has reference more particularly to improvements in those types of chains made up of a succession of identical links, joined by means and in a manner that permits a universal, pivotal movement of the links at their points of connection, thus providing that the chain can be flexed laterally in any direction from a normal line of travel.

It is the principal object of this invention to provide a chain which is applicable to various uses, and which comprises a succession of identical links of novel form that are joined by link connectors, also of novel form, that are easily and readily insertable to effect the pivotal joining of the links, and also may be easily and readily removed for the replacement of links or for the addition or removal of links to increase or shorten the chain.

It is a further object of the invention to provide a chain of the above stated character, comprising swivelly connected links that are adapted to receive the teeth of a sprocket wheel for the driving of the chain in either direction of travel, and also can be used in an inverted position.

Yet another object of the invention is to provide a conveyor chain, made up of a succession of identical links, each joined to those next adjacent thereto by pivot pins of novel form which have no fixed connections with the links, but which cannot be displaced from functional positions after their application except by a certain relative adjustment of the links that is possible only upon substantial slackening of the chain.

Still further objects of the invention and advantages residing therein are to be found in the details of construction of the links and link connecting pins, and in the combination and relationship of these parts, as will hereinafter be fully described.

In accomplishing these and other objects of the invention, I have provided the improved details of construction the preferred forms of which are illustrated in the accompanying drawings, wherein—

Fig. 1 is a plan, or top view, of a section of a chain belt made up of a succession of links and link connecting pins embodying the improvements of the invention therein.

Fig. 2 is a side view of a section of a chain embodied by the invention shown as passing about a sprocket wheel; parts of certain links being broken away for better understanding of the application of the connecting pin.

Fig. 3 is a top view of two pivotally joined links of the chain, illustrating the lateral angular movement of one relative to the other that has been provided for.

Fig. 4 is a top view of disconnected links, indicating steps in the method of connecting one with the other by means of the pivot pin.

Fig. 5 is a side view of the links, further illustrating their joining, and a relative positioning for their disconnection.

Fig. 6 is a perspective view of one of the link connecting pivot pins.

Fig. 7 is a perspective view of one of the chain links.

The present conveyor chain comprises a succession of identical links that are swivelly joined together for universal, pivotal movement at their points of connection by means of connectors which I will refer to as "pins." When the links are joined together by these pins to form a continuous belt, the belt can be passed over driving sprocket wheels, as has been illustrated in Fig. 2. Furthermore, the construction of the chain provides that it can be driven, through the mediacy of a sprocket wheel, in either direction of travel and can be guided along lateral curves in either direction from the plane of the sprocket wheel as has been indicated by the angular relationship of links shown in Fig. 3.

The articulation of the links in the chain is made possible by reason of details of construction of links and of the connecting pins which will now be described in detail.

Referring more in detail to the drawings—

Each link of the chain is like that shown in Fig. 7, and is designated in its entirety by reference numeral 10. Each link has a U-shaped body, comprising top and bottom plates, 10a and 10b, that are co-extensive, and are joined at one end of the body by semi-cylindrically curved end portions 12, which provide pivot pin seats 12x on their inner surfaces. In effect, each link comprises a single, elongated, flat metal plate that is bent, at a point medial of its ends about a transverse axial line thus to provide the body with parallel spaced, upper and lower face plates 10a and 10b and the plate connecting portion 12. The particular way of forming the links is immaterial. They might be originally in plate form and bent to shape, or they may be cast, forged, or formed in any other suitable manner.

Regardless of how the links are formed, each is provided at the closed or base end of the U-shaped body, and opening to that end, with a rather deep cut recess 15, formed in the opposite side plates and also in the end wall 12. This recess is of a size required to contain therein the end portion of the next adjacent link as shown in Figs. 1 and 3. Opposite its recessed end, each link is formed with tongues 16 which comprise the end portions of the plates 10a and 10b. If a link is formed from a flat metal plate, these tongues are formed by cutting away, or recessing opposite sides of the plates, as at 17—17 in Figs. 1, 3 and 4, and then rounding off the end of the tongue thus formed, as at 18. Regardless of how the links are formed, the tongue portions 16 are semi-circularly rounded at their ends, and are of such transverse diameter at the ends that they can be received with clearance along their side edges within the recesses 15. Also, the opposite side edges of each tongue is somewhat converged from the rounded end toward the base so that assembled links can be adjusted from the straight alignment in which they are shown in Fig. 1, to the angular relationship shown in Fig. 3, to either side of the chain belt.

The top and bottom plates 10a and 10b of each link are formed with centrally located, longitudinally extending slots 20, that extend well into the tongues 16 and terminate at their outer ends in semi-circularly curved seats 21 that are concentric of the circularly curved end surfaces 18 of the tongues. Each slot 20 terminates at its inner end at about the medial point between the ends of the link and, at that point, the upper and lower plates of the link are joined by a cross bar or plate 25 that is arcuately curved, between the plates toward the tongue end of the link as is well shown in Fig. 2, this plate provides a contact surface against which the tooth of a sprocket wheel can engage in the guiding or driving of the chain. In Fig. 2 a part of a sprocket wheel is designated by numeral 28 and sprocket teeth thereon are designated at 28'.

Considering the chain as seen in Fig. 1, it is to be understood that the semi-circular seats 21 at the ends of the slots 20 are all of the same radius directly and those in the same link are vertically aligned. Also, it is to be understood that the semi-circular seats 12x at the opposite sides of the recess 15 at the closed end of each link are of the same radius of curvature and are transversely aligned. It is desirable, also, as has been shown in Fig. 7, that the outside edges of the tongues be rounded off as at 29.

To swivelly join the links of the chain, I employ pivot pins of the kind best shown in Fig. 6. Each pin comprises a straight, round bar 35, adapted to be received between the plates 10a and 10b of the link body and its opposite end portions seated pivotally against the semi-circular seats 12x of the end members 12. The radius of curvature of the pin is equal to that of the seats against which they engage, as has been shown in Fig. 2, and the length of the pin is approximately equal to the width of the link across its closed end.

At a point mid-way of its ends, the pin 35 is formed with aligned, oppositely directed pivot studs 36—36. The axial line of these studs intersects the axis of the pin 35 at a right angle. These studs are adapted to seat pivotally against the semi-circular seats 21 formed at the outer ends of the slots 20, as shown in Fig. 2. It is observed also in Fig. 2, that the studs 36—36 terminate flush with the outer surfaces of the plates 10a and 10b, and that side portion of the studs opposite the surfaces which normally engage the seats, are cut away, as at 40 in Figs. 1 and 6, so that the studs will clear the teeth of the sprocket wheel when the chain is being carried thereabout.

This will be understood by reference to the showing in Fig. 2.

The assembling and joining of links 10 by means of the pivot pins is best carried out as follows: First, a pin 35 is disposed within the closed end portion of a link 10 as shown in Fig. 4. Then the link that is to be joined therewith is moved from full line position of Fig. 4 to the dotted line position, at which position the plate tongues 16 are located within the body recess 15 and receive the pin between them. Then the two links are adjusted to the angular relationship of Fig. 5, and this permits the pin 35 to be axially rotated to dispose the oppositely extending studs 36 in the tongue slots 20, and then to be engaged against the slot seats 21 as in Figs. 1, 2 and 3. The pin 35 is thus locked against endwise movement by the studs and cannot be displaced from the links except by a substantial stacking of the belt that will permit the link relationship of Fig. 5 to be effected. So long as the belt is under normal tension, the pin ends engage pivotally against seats 12x and studs 36 engage pivotally against seats 21.

The construction of links and pivot pins permits easy and ready joining of links to provide a belt of any length desired. Also, the disconnection of links is just as easily and readily accomplished upon providing the slack necessary. Parts can be easily replaced when necessary.

One of the most important advantages resides in the fact that the link construction permits the use of the chain in an inverted position and provides that the chain can be driven in either direction; this being possible by reason of the fact that the details of construction of links and pins at opposite sides of the central horizontal plane and central vertical plane are alike. A chain can pass around a sprocket wheel in one direction and pass therefrom about another wheel in the opposite direction.

Having thus described my invention, what I claim as new therein and desire to secure by Letters Patent, is—

1. A conveyor chain comprising a plurality of links, and pivot pins joining said links end to end for universal pivotal action; each of said links comprising spaced, parallel opposite side plates, joined at one end of the link by a semi-cylindrically curved end wall, and terminating at their other ends in tongue portions that are rounded at their ends and have opposite side edges converged toward the base of the tongues, each link also being formed with a recess extended thereinto through its closed end and adapted to freely contain the tongue portions of the adjoining link therein with clearance for universal action, and said side plates being formed along the longitudinal center of the link with coextensive slots terminating in the outer ends of the tongues in semi-circular seats concentric of the tongue ends; each of said pivot pins having a diameter substantially equal to the distance between said side plates, and said pins being disposed between the plates with opposite end portions thereof pivotally engaged against the curved end wall of the link, and having pivot studs formed thereon between its ends, in alignment and at right angles thereto, engaged pivotally in the end seats of the plate slots of the adjoining link.

2. A conveyor chain comprising a succession of identical links with pivot pins joining the links in end to end relationship for articulation; each of said links comprising parallel and spaced opposite side plates each terminating at one end of the link in a tongue portion and said plates being rigidly joined at the other end of the link by an integral, semi-cylindrically curved end wall having a recess opening therethrough and extended well into each of the side plates thus providing open spaces therein for containing the corresponding tongues of the next adjacent link for articular action therein and said recess defining transversely spaced, semi-cylindrical seats in the end wall at opposite sides thereof, said tongue portions of the said link having axially aligned pivot seats therein, disposed in the longitudinal central plane of the link and faced in a direction opposite the facing of the transversely spaced seats of the end wall, and said pivot pins being disposed between the side plates and the tongue portions of adjacent links with their opposite end portions seated in the semi-cylindrical seats of the end wall of the link, and each of said pins having pivot studs extending therefrom in opposite directions and in axial alignment and at a right angle to the pin axis and pivotally seated in the pivot seats of the tongue portions between which the pin extends.

3. A conveyor chain as recited in claim 2, wherein the tongue portions of each link are formed in their central longitudinal planes with elongated slots, terminating near the ends of the tongues in a rounded end surface providing a pivot seat for a pin stud.

4. A conveyor chain as recited in claim 3 wherein the tongue slots are adapted to receive the teeth of a sprocket wheel to effect an operating connection between wheel and chain, and wherein the pivot pins as disposed in the links will engage in driving contact with the sprocket teeth when in such operating connection.

5. A conveyor chain as recited in claim 4 wherein the opposite side plates of each link are joined between the inner ends of the tongue slots by a cross bar, spaced from the pivot pin to receive the sprocket teeth of a sprocket wheel between them for driving the chain in either direction.

HOWARD W. WYLIE.

References Cited in the file of this patent

UNITED STATES PATENTS

| Number | Name | Date |
|---|---|---|
| 1,893,141 | Kampfer | Jan. 3, 1933 |
| 1,965,285 | Gilstad | July 3, 1934 |